United States Patent
Lee et al.

(10) Patent No.: US 8,179,758 B2
(45) Date of Patent: May 15, 2012

(54) OPTICAL DISC HAVING TRACKING POLARITY INFORMATION, AND APPARATUSES AND METHODS FOR RECORDING AND REPRODUCING USER DATA ON THE SAME

(75) Inventors: Kyung-geun Lee, Gyeonggi-do (KR);
In-sik Park, Gyeonggi-do (KR);
Jung-wan Ko, Gyeongi-do (KR);
Du-seop Yoon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/940,072

(22) Filed: Nov. 14, 2007

(65) Prior Publication Data
US 2008/0072245 A1    Mar. 20, 2008

Related U.S. Application Data

(63) Continuation of application No. 10/695,393, filed on Oct. 29, 2003, now Pat. No. 7,362,691.

(30) Foreign Application Priority Data

Nov. 4, 2002 (KR) ................................. 2002-67968

(51) Int. Cl.
*G11B 7/00* (2006.01)
(52) U.S. Cl. .................. 369/52.1; 369/44.11; 369/275.1
(58) Field of Classification Search ............... 369/275.1, 369/44.11, 52.1
See application file for complete search history.

(56) References Cited

U.S. PATENT DOCUMENTS

| | | | | |
|---|---|---|---|---|
| 5,737,284 | A * | 4/1998 | Yamada | 369/30.04 |
| 6,295,262 | B1 | 9/2001 | Kusumoto et al. | |
| 6,343,062 | B1 * | 1/2002 | Furukawa et al. | 369/275.4 |
| 6,819,643 | B2 | 11/2004 | Kobayashi et al. | |
| 6,822,937 | B2 | 11/2004 | Tsukagoshi et al. | |
| 6,894,962 | B1 | 5/2005 | Nishiuchi et al. | |
| 6,977,880 | B2 * | 12/2005 | Tomita | 369/59.16 |
| 7,038,997 | B2 * | 5/2006 | Osakabe | 369/275.1 |
| 7,304,937 | B1 * | 12/2007 | Xie | 369/272.1 |
| 7,362,691 | B2 * | 4/2008 | Lee et al. | 369/275.1 |
| 7,369,472 | B2 | 5/2008 | Lee et al. | |
| 2001/0007545 | A1 * | 7/2001 | Ueda et al. | 369/47.15 |

(Continued)

FOREIGN PATENT DOCUMENTS

CN     1213125 A     4/1999

(Continued)

OTHER PUBLICATIONS

U.S. Appl. No. 11/941,451, filed Nov. 16, 2007, Kyung-geun Lee, et al., Samsung Electronics Co., Ltd.

(Continued)

*Primary Examiner* — Latanya Bibbins
(74) *Attorney, Agent, or Firm* — NSIP Law

(57) ABSTRACT

An optical disc includes tracking polarity information. The optical disc includes a clamping area, a lead-in area, a data area, and burst cutting area (BCA). The BCA is present between the clamping area and the lead-in area and in which information regarding the optical disc is recorded, and the information is read before performing tracking in the data area. Accordingly, it is possible to obtain the tracking polarity information and/or reflectivity information without trial and error and directly record or reproduce user data in a data area of the optical disc

20 Claims, 5 Drawing Sheets

U.S. PATENT DOCUMENTS

| | | | |
|---|---|---|---|
| 2001/0008578 A1 | 7/2001 | Otomo et al. | |
| 2002/0003757 A1 | 1/2002 | Uhde et al. | |
| 2002/0021656 A1* | 2/2002 | Tsukagoshi et al. | 369/275.3 |
| 2003/0016603 A1 | 1/2003 | Tomita | |
| 2003/0076775 A1 | 4/2003 | Sato et al. | |
| 2003/0202436 A1 | 10/2003 | Tomita et al. | |
| 2003/0219124 A1* | 11/2003 | Selinfreund et al. | 380/201 |
| 2005/0099916 A1 | 5/2005 | Jeon et al. | |
| 2005/0238333 A1 | 10/2005 | Ueda et al. | |
| 2008/0056095 A1 | 3/2008 | Tomita | |
| 2008/0068961 A1* | 3/2008 | Lee et al. | 369/53.37 |
| 2008/0080350 A1* | 4/2008 | Lee et al. | 369/53.37 |
| 2008/0094956 A1* | 4/2008 | Lee et al. | 369/47.1 |
| 2008/0094983 A1* | 4/2008 | Lee et al. | 369/53.37 |
| 2008/0094984 A1* | 4/2008 | Lee et al. | 369/53.37 |
| 2008/0094995 A1* | 4/2008 | Lee et al. | 369/100 |
| 2008/0095034 A1* | 4/2008 | Lee et al. | 369/283 |
| 2008/0101207 A1* | 5/2008 | Lee et al. | 369/275.3 |
| 2008/0106993 A1* | 5/2008 | Lee et al. | 369/53.37 |
| 2008/0107001 A1* | 5/2008 | Lee et al. | 369/275.3 |

FOREIGN PATENT DOCUMENTS

| | | |
|---|---|---|
| CN | 1304137 | 7/2001 |
| CN | 1592930 | 3/2005 |
| CN | 1311441 C | 4/2007 |
| EP | 0 905 683 | 3/1999 |
| EP | 1 102 263 | 5/2001 |
| EP | 1 501 085 A1 | 1/2005 |
| EP | 0 997 899 | 5/2005 |
| EP | 1 170 744 | 4/2008 |
| GB | 2 332 977 | 7/1999 |
| JP | 02-149932 | 6/1990 |
| JP | 06-267082 A | 9/1994 |
| JP | 9-106625 | 4/1997 |
| JP | 10-269593 A | 10/1998 |
| JP | 2000-2002422 | 7/2000 |
| JP | 2002-15466 | 1/2002 |
| JP | 2002-050053 | 2/2002 |
| JP | 2002-050088 | 2/2002 |
| JP | 2002-504258 | 2/2002 |
| JP | 2002-93059 | 3/2002 |
| JP | 2002-150568 | 5/2002 |
| KR | 2001-47957 | 8/2001 |
| KR | 2003-13774 | 2/2003 |
| KR | 2004-33433 | 4/2004 |
| WO | WO 98/58368 | 12/1998 |
| WO | WO 01/45096 | 6/2001 |
| WO | WO 02/086873 | 10/2002 |
| WO | WO 02/37483 | 4/2003 |
| WO | WO 2004/019331 | 3/2004 |

OTHER PUBLICATIONS

U.S. Appl. No. 11/941,501, filed Nov. 16, 2007, Kyung-geun Lee, et al., Samsung Electronics Co., Ltd.
U.S. Appl. No. 11/941,525, filed Nov. 16, 2007, Kyung-geun Lee, et al., Samsung Electronics Co., Ltd.
U.S. Appl. No. 11/941,530, filed Nov. 16, 2007, Kyung-geun Lee, et al., Samsung Electronics Co., Ltd.
U.S. Appl. No. 11/959,721, filed Dec. 19, 2007, Kyung-geun Lee, et al., Samsung Electronics Co., Ltd.
U.S. Appl. No. 11/959,733, filed Dec. 19, 2007, Kyung-geun Lee, et al., Samsung Electronics Co., Ltd.
U.S. Appl. No. 11/959,738, filed Dec. 19, 2007, Kyung-geun Lee, et al., Samsung Electronics Co., Ltd.
U.S. Appl. No. 11/959,750, filed Dec. 19, 2007, Kyung-geun Lee, et al., Samsung Electronics Co., Ltd.
U.S. Appl. No. 11/959,757, filed Dec. 19, 2007, Kyung-geun Lee, et al., Samsung Electronics Co., Ltd.
U.S. Appl. No. 11/959,795, filed Dec. 19, 2007, Kyung-geun Lee, et al., Samsung Electronics Co., Ltd.
U.S. Appl. No. 11/959,802, filed Dec. 19, 2007, Kyung-geun Lee, et al., Samsung Electronics Co., Ltd.
U.S. Appl. No. 11/959,817, filed Dec. 19, 2007, Kyung-geun Lee, et al., Samsung Electronics Co., Ltd.
U.S. Appl. No. 11/959,827, filed Dec. 19, 2007, Kyung-geun Lee, et al., Samsung Electronics Co., Ltd.
U.S. Appl. No. 11/959,842, filed Dec. 19, 2007, Kyung-geun Lee, et al., Samsung Electronics Co., Ltd.
U.S. Appl. No. 11/959,855, filed Dec. 19, 2007, Kyung-geun Lee, et al., Samsung Electronics Co., Ltd.
U.S. Appl. No. 11/959,865, filed Dec. 19, 2007, Kyung-geun Lee, et al., Samsung Electronics Co., Ltd.
U.S. Appl. No. 11/959,888, filed Dec. 19, 2007, Kyung-geun Lee, et al., Samsung Electronics Co., Ltd.
U.S. Appl. No. 11/959,903, filed Dec. 19, 2007, Kyung-geun Lee, et al., Samsung Electronics Co., Ltd.
Office Action issued by Korean Intellectual Property Office in Korean Patent Application No. 2002-67968 on Nov. 20, 2006.
Office Action issued by Chinese Patent Office in Chinese Patent Application No. 200380102288.3 on Apr. 21, 2003.
Patent Abstract for PCT Publication No. WO 02/37483, published May 10, 2002.
U.S. Appl. No. 10/695,393, filed Oct. 29, 2003, Kyung-geun Lee et al., Samsung Electronics Co., Ltd.
U.S. Appl. No. 11/542,134, filed Oct. 4, 2006, Kyung-geun Lee et al., Samsung Electronics Co., Ltd.
First Office Action issued by the State Intellectual Property Office of the People's Republic of China on May 23, 2008 re: Chinese Application No. 200710006544.9 (12 pp).
ECMA: Standardizing Information Communication Systems, "Standard ECMA—330:1120 mm (4,7 Gbytes per side) and 80 mm (1,46 Gbytes per side) DVD Rewritable Disk (DVD-RAM)", Jun. 1, 2002.
Search Report issued by the European Patent Office in European Patent Application No. 03754294.1 on Nov. 11, 2008.
Office Action issued by Japanese Patent Office in Japanese Patent Application No. 2004-549669 on Aug. 21, 2009.
English Abstract of WO 98/058368.
Office Action issued by the Japanese Patent Office on Apr. 28, 2009.
Japanese Office Action issued on May 18, 2010, in corresponding Japanese Application No. 2004-549669 (3 pages).
European Examination Report issued on Feb. 23, 2011, in corresponding European Application No. 03754294.1 (4 pages).
Japanese Office Action issued on Jul. 12, 2011, in counterpart Japanese Patent Application No. 2004-549669 (5 pages including English translation).
Japanese Office Action issued Nov. 8, 2011, in counterpart Japanese Application No. 2004-549669 (8pp, including English translation).

* cited by examiner

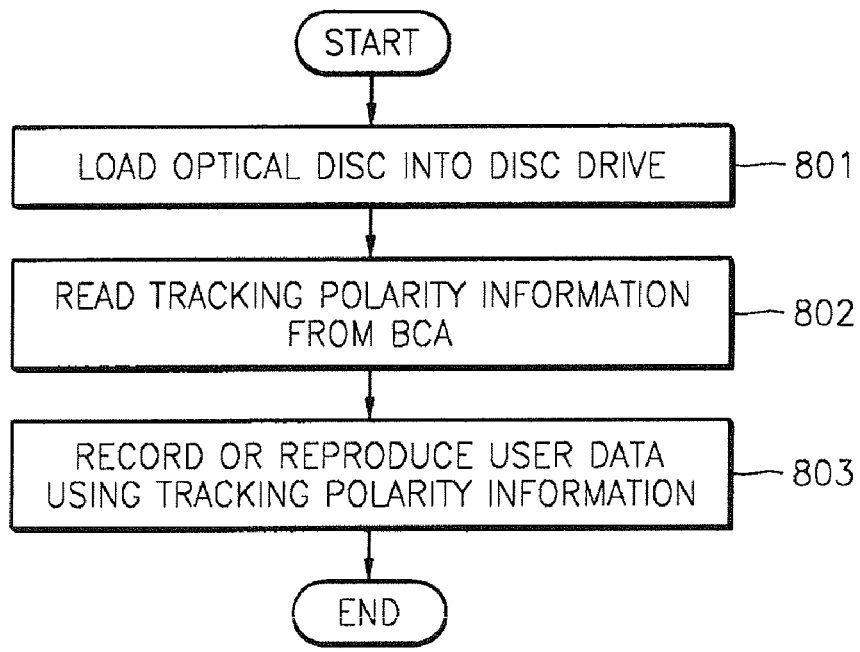
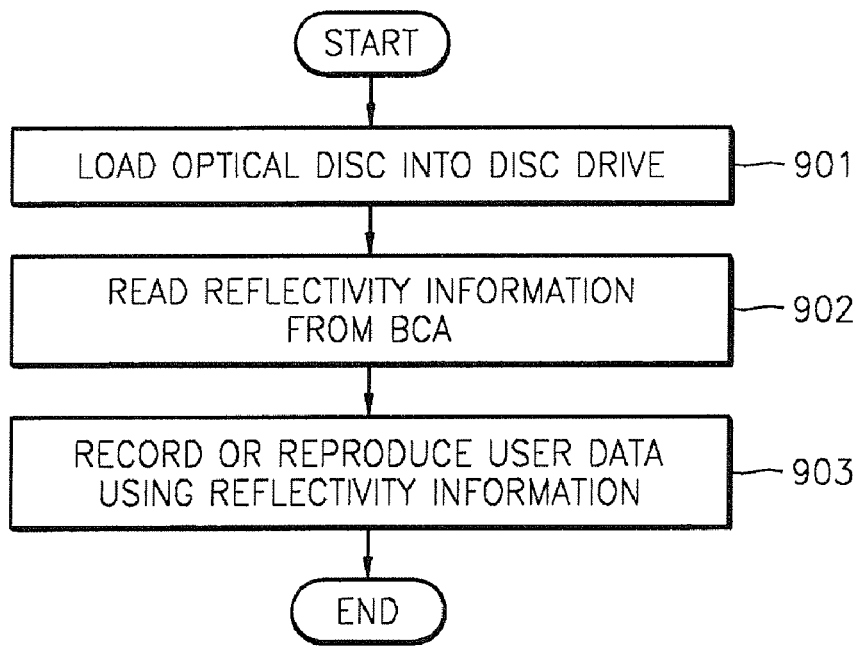

OPTICAL DISC HAVING TRACKING POLARITY INFORMATION, AND APPARATUSES AND METHODS FOR RECORDING AND REPRODUCING USER DATA ON THE SAME

CROSS-REFERENCE TO RELATED APPLICATIONS

This application is a continuation of application Ser. No. 10/695,393 filed on Oct. 29, 2003, now U.S. Patent No. 7,362, 691, which claims the benefit of Korean Patent Application No. 2002-67968 filed on Nov. 4, 2002, in the Korean Intellectual Property Office, the disclosure of which is incorporated herein by reference in its entirety.

BACKGROUND OF THE INVENTION

1. Field of the Invention

The present invention relates to an optical disc, and more particularly, to an optical disc having at least one recording layer, and apparatuses and methods for recording and reproducing data on the same.

2. Description of the Related Art

Compact discs (CDs) and digital versatile discs (DVDs) are the most popular types of data storage media. In general, user data is recorded on pits of a recording layer of a read-only optical disc and recorded by changing a phase of a phase change material (PCM) on the recording layer of a rewritable optical disc which is covered with the PCM.

A pickup, which is included in an optical disc reproducing apparatus, detects a precise position of a track in which the user data is recorded, receives a laser beam reflected from the track, and reads the user data from the laser beam. A signal that the pickup uses to detect a position of a desired track is called a tracking signal. The tracking signal is obtained when a photodiode, which has a plurality of light receiving parts, receives the laser beam. Signals are generated from light received by the respective light receiving parts, and then, the signals are added together or subtracted from each other. The tracking signal has an S-shape and right and left sides of the tracking signal, which are divided with respect to a central point of the tracking signal, have opposite polarities.

The polarities of the tracking signal change according to a type of the optical disc or physical characteristics of the recording layer on the optical disc, such as the physical characteristics of the pit or the track. In other words, the polarities of the tracking signal change from (−) to (+) and from (+) to (−) according to the type of optical disc or the physical characteristics of the recording layer. Therefore, when the optical disc is loaded into a conventional optical disc reproducing apparatus, the apparatus determines the polarity of a tracking signal by trial and error, detects the position of the track in which the user data is recorded based on the polarity, and reads the user data from the track. That is, the conventional optical disc reproducing apparatus spends considerable time in detecting the polarity of the tracking signal before reading the user data, thereby delaying a reproduction of the user data.

Meanwhile, a reflectivity of the optical disc is a ratio of a power of the laser beam reflected from the recording layer of the optical disc to the power of the laser beam incident on the recording layer. The reflectivity also depends on the type of optical disc or the physical characteristics of the recording layer, and therefore, the conventional optical disc reproducing apparatus detects the reflectivity by trial and error.

SUMMARY OF THE INVENTION

The present invention provides an optical disc from which information regarding a polarity of a tracking signal and/or a reflectivity is easily recognized, and apparatuses and methods for recording and reproducing information on the same.

Additional aspects and/or advantages of the invention will be set forth in part in the description which follows and, in part, will be obvious from the description, or may be learned by practice of the invention.

According to an aspect of the present invention, there is provided an optical disc including a clamping area; a lead-in area; a data area; and a burst cutting area (BCA) which is present between the clamping area and the lead-in area and in which information regarding the optical disc is recorded, wherein the information is read before performing tracking in the data area.

According to an aspect of the present invention, the information regarding the optical disc is at least one of tracking polarity information and reflectivity information, and the tracking polarity information and the reflectivity information are recorded with a pattern of crystalline or non-crystalline marks.

According to an aspect of the present invention, the recording of the tracking polarity information begins at leading bytes in the BCA and is repeatedly recorded.

According to an aspect of the present invention, first two bits of the leading bytes of the tracking polarity information include identifiers of the respective tracking polarity information that is repeatedly recorded several times, and other six bits include remaining information of the tracking polarity information.

According to an aspect of the present invention, one of the six bits includes flag information that indicates whether other information is recorded in the BCA, and the other five bits of the six bits include the tracking polarity information that indicates a polarity of a tracking signal related to each recording layer of the optical disc.

According to another aspect of the present invention, there is provided an optical disc including a first recording layer in which a first lead-in area, a first data area, and a first lead-out area are formed; and a second recording layer in which a second lead-in area, a second data area, and a second lead-out area are formed, wherein at least one of the first and second recording layers includes a burst cutting area (BCA), in which information regarding the optical disc is recorded, and the information is read before performing tracking in the first and second data areas.

According to an aspect of the present invention, the information regarding the optical disc is at least one of tracking polarity information and reflectivity information, and the tracking polarity information and the reflectivity information are recorded with a pattern of crystalline or non-crystalline marks.

According to an aspect of the present invention, the recording of the tracking polarity information begins in leading bytes in the BCA and is repeatedly recorded.

According to yet another aspect of the present invention, there is provided a method of recording information on an optical disc that has at least one recording layer, the method including recording at least one of tracking polarity information and reflectivity information in a burst cutting area (BCA) of the recording layer.

According to still another aspect of the present invention, there is provided a method of reproducing information on an optical disc which has at least one recording layer, the method including reading tracking polarity information in a burst cutting area (BCA) of the recording layer, and analyzing the read tracking polarity information, outputting an analysis result indicative thereof, performing tracking in the recording layer of the optical disc using the analysis result, and recording or reproducing user data on the optical disc.

According to still another aspect of the present invention, there is provided a method of reproducing information on an optical disc which has at least one recording layer, the method including reading reflectivity information in a burst cutting area (BCA) of the recording layer; and analyzing the reflectivity information and outputting an analysis result indicative thereof, adjusting the write or read power of a laser beam using the analysis result, and recording or reproducing user data on the optical disc.

According to still another aspect of the present invention, there is provided an optical disc recording apparatus including a controller creating at least one of tracking polarity information and reflectivity information; and a recording unit recording the at least one of tracking information and reflectivity information created by the controller in a burst cutting area (BCA) of an optical disc.

According to an aspect of the present invention, there is provided an optical disc, comprising: a first recording layer formed on the optical disc; a second recording layer formed on the optical disc, wherein the first recording layer and a second recording layer each comprise a clamping area, a burst cutting area (BCA), a lead-in area, and a lead-out area, wherein the clamping area is an area that is pressurized to clamp the optical disc, and the BCA is an area in which tracking polarity information and/or reflectivity information is recorded; and a data area recording user data between the lead-in area and the lead-out area.

BRIEF DESCRIPTION OF THE DRAWINGS

The above and/other other aspects and advantages of the present invention will become more apparent by describing in detail aspects thereof with reference to the attached drawings in which:

FIG. 8 is a flowchart illustrating a method of reproducing data from the optical disc, according to an aspect of the present invention; and FIG. 9 is a flowchart illustrating the method of reproducing data from the optical disc, according to another aspect of the present invention.

DETAILED DESCRIPTION OF THE EMBODIMENTS

Figure 1:
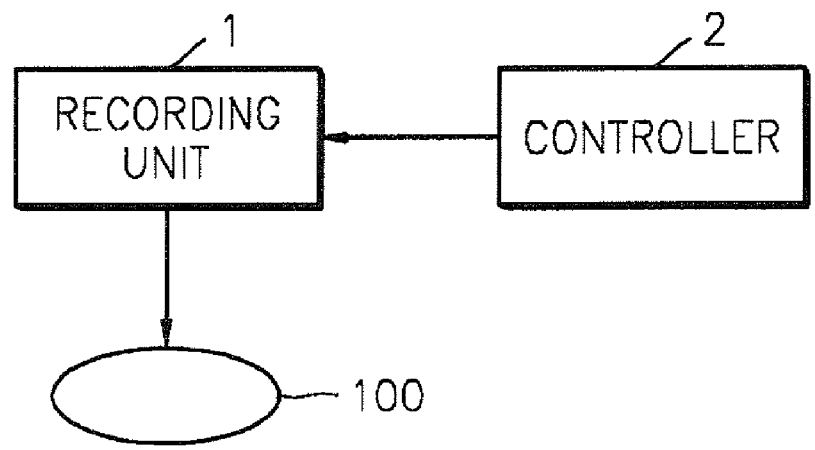
FIG. 1 is a schematic block diagram of an optical disc recording apparatus, according to an aspect of the present invention.

Reference will now be made in detail to the present aspects of the present invention, examples of which are illustrated in the accompanying drawings, wherein like reference numerals refer to the like elements throughout. The aspects are described below in order to explain the present invention by referring to the figures.

FIG. 1 is a schematic block diagram of an optical disc recording apparatus, according to an aspect of the present invention. Referring to FIG. 1, the recording apparatus includes a recording unit 1 and a controller 2 to record information regarding a polarity of a tracking signal and/or a reflectivity of an optical disc 100 on a burst cutting area (BCA) on the optical disc 100. The controller 2 creates the information regarding the polarity of the tracking signal and/or the reflectivity of the BCA and the recording unit 1 records at least one of tracking polarity information and reflectivity information on the BCA. Thus, the BCA of the optical disc 100, according to an aspect of the present invention, includes the tracking polarity information and/or the reflectivity information.

Figure 2:
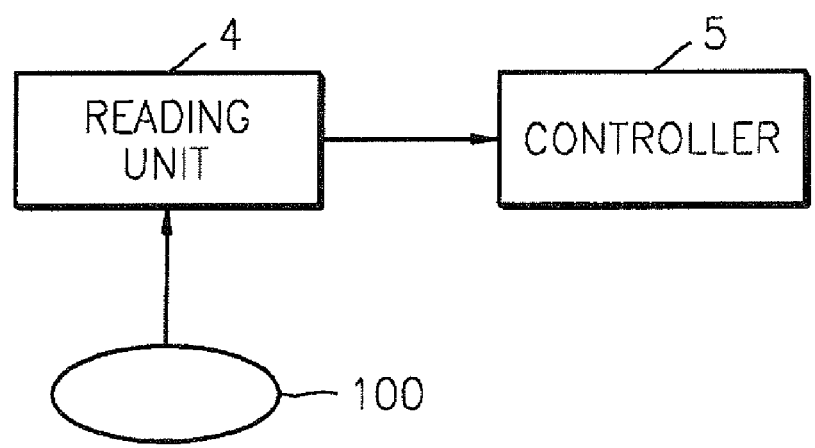
FIG. 2 is a schematic block diagram of an optical disc reproducing apparatus, according to an aspect of the present invention.

FIG. 2 is a schematic block diagram of an optical disc reproducing apparatus, according to an aspect of the present invention. Referring to FIG. 2, the reproducing apparatus includes a reading unit 4 and a controller 5. The reading unit 4 reads the tracking polarity information and/or the reflectivity information from the BCA on the optical disc 100, according to an aspect of the present invention, and provides an analysis result indicative thereof to the controller 5. Then, the controller 5 analyzes the tracking polarity information and/or the reflectivity information and reproduces user data from the optical disc 100 based on the analysis result.

The recording apparatus of FIG. 1 is an apparatus used in a mastering process by a disc manufacturer. The reproducing apparatus of FIG. 2 is an apparatus to reproduce the tracking polarity information and/or the reflectivity information, not the user data, from the BCA. Thus, the reproducing apparatus of FIG. 2 can be included in both the optical disc recording apparatus and the optical disc reproducing apparatus because the reproduction of the above information can be carried out when recording or reproducing the user data on the optical disc 100.

Figure 3:
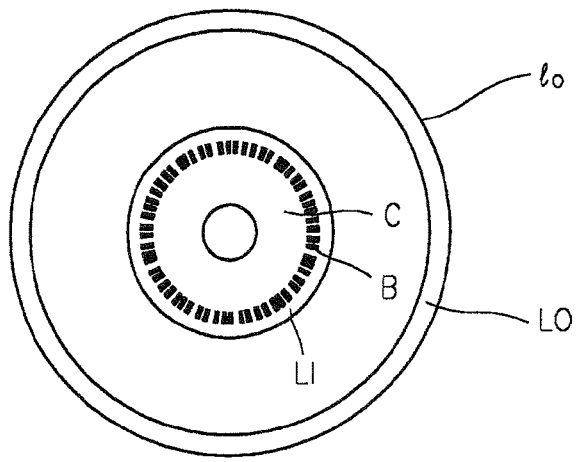
FIG. 3 is a schematic block diagram of an optical disc, according to an aspect of the present invention.

FIG. 3 is a schematic block diagram of the optical disc 100, according to an aspect of the present invention. Referring to FIG. 3, a first recording layer 10 is formed on the optical disc 100. The first recording layer 10 includes a clamping area C, the BCA B, a lead-in area LI, and a lead-out area LO. The clamping area C is an area that is pressurized by a clamping tool in order to clamp the optical disc 100. In general, the clamping area C is circular band shaped and formed in an inner portion of the optical disc 100. The BCA B is an area in which the tracking polarity information and/or the reflectivity information is recorded. The particulars of the optical disc 100, such as a corresponding serial number and manufacturing date, may be further recorded in the BCA B. A data area in which the user data is recorded, is present between the lead-in area LI and the lead-out area LO. If the first recording layer 10 is formed of a phase change material (PCM), the tracking polarity information and/or the reflectivity information may be recorded with a pattern of crystalline and/or non-crystalline marks. A method of recording information in the BCA B is disclosed in Korean Patent Application No. 2001-47957 entitled "Optical Disc and Methods for Recording and Reproducing Essential Information of Optical Disc," also filed by the present applicant.

Figure 4A:
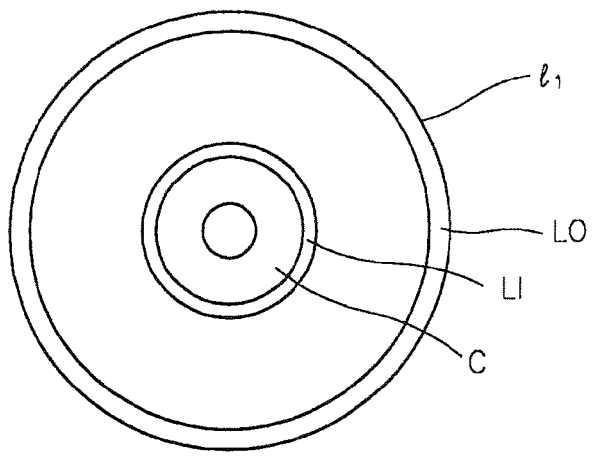
FIGS. 4A and 4B are schematic block diagrams of the optical disc, according to another aspect of the present invention.
Figure 4B:
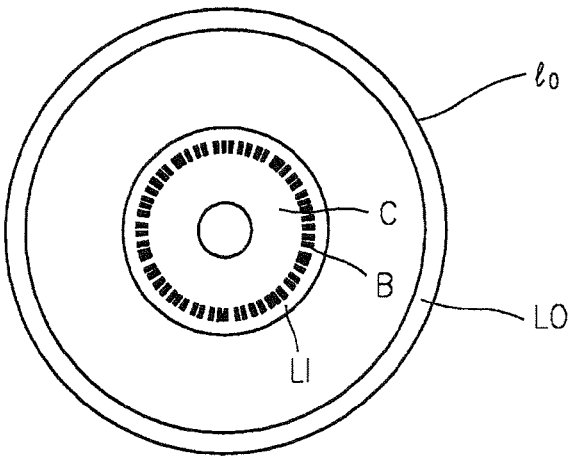

FIGS. 4A and 4B are schematic block diagrams of the optical disc 100, according to another aspect of the present invention. Referring to FIGS. 4A and 4B, the first recording layer 10 and a second recording layer 11 are formed on the optical disc 100. Each of the first recording layer 10 and the second recording layer 11 includes the clamping area C, the lead-in area LI, and the lead-out area LO. The data area in which the user data is recorded is present between the lead-in area LI and the lead-out area LO. The clamping area C, the lead-in area LI, and the lead-out area LO are the same as those explained with respect to FIG. 3, and therefore, their descriptions will not be repeated here. Further, the BCA B is present between the clamping area C and the lead-in area LI of the first recording layer 10. The tracking polarity information and/or the reflectivity information is recorded in the BCA B, according to an aspect of the present invention. The particulars of the optical disc 100, such as the corresponding serial number and the manufacturing date, may be further recorded in the BCA B. If the first recording layer 10 is formed of the phase change material (PCM), the tracking polarity information and/or the reflectivity information may be recorded with the pattern of the crystalline and/or the non-crystalline marks.

Figure 5A:
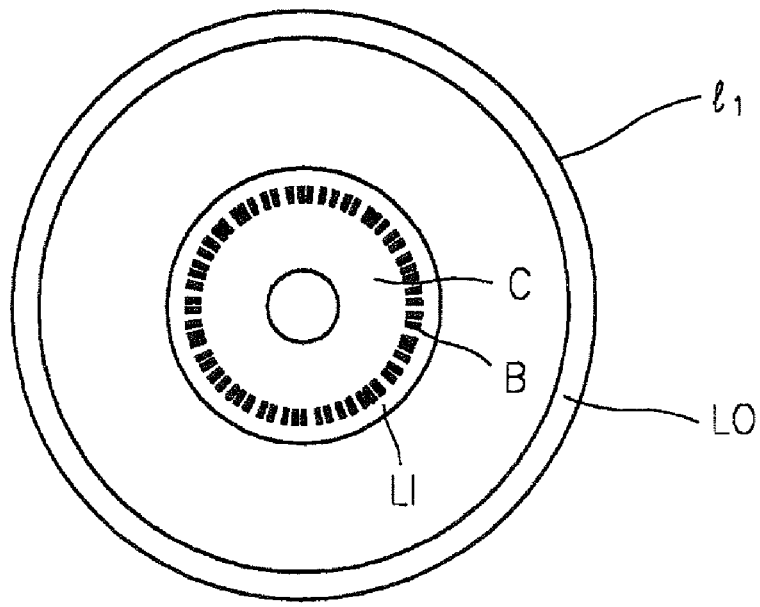
FIGS. 5A and 5B are schematic block diagrams of the optical disc according to still another aspect of the present invention.
Figure 5B:
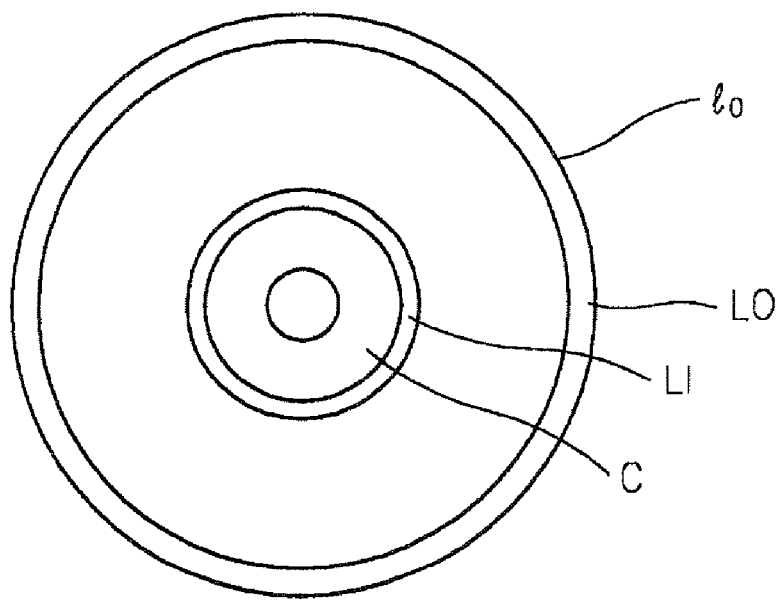

FIGS. 5A and 5B are schematic block diagrams of the optical disc 100, according to still another aspect of the present invention. Referring to FIGS. 5A and 5B, the first recording layer 10 and the second recording layer 11 are formed on the optical disc 100. Each of the first recording layer 10 and the second recording layer 11 includes a clamping area C, a lead-in area LI, and a lead-out area LO. The data area in which the user data is recorded is present between the lead-in area LI and the lead-out area LO. The clamping area C, the lead-in area LI, and the lead-out area LO are the same as those explained with respect to FIG. 3, and therefore, their descriptions will not be repeated here. According to an aspect of the present invention, the BCA B is formed on the second recording layer 11, unlike in FIGS. 4A and 4B in which the BCA B is present on the first recording layer 10. That is, the BCA B of FIGS. 5A and 5B is present between the clamping area C and the lead-in area LI of the second recording layer 11. If the second recording layer 11 is formed of the phase change material (PCM), the tracking polarity information or reflectivity information may be recorded with a pattern of crystalline and/or non-crystalline marks.

In conclusion, the optical disc 100 of FIGS. 5A and 5B is different from that of FIGS. 4A and 4B in that the BCA B is present in the second recording layer, not the first recording layer.

Figure 6A:
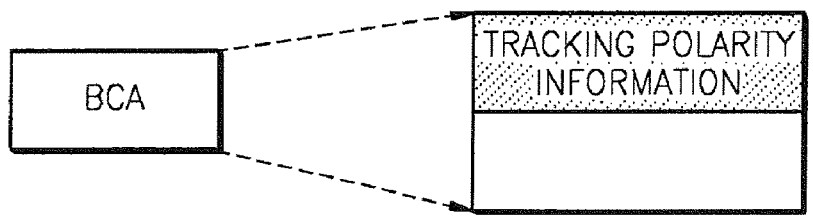
FIG. 6A illustrates a data structure of a burst cutting area (BCA) of the optical disc, according to an aspect of the present invention.

FIG. 6A illustrates a data structure of the BCA of the optical disc 100, according to an aspect of the present invention. Referring to FIG. 6A, the tracking polarity information is recorded in the BCA, according to an aspect of the present invention. The tracking polarity information provides the polarity of the tracking signal related to the optical disc 100. The tracking signal has an S-shape and corresponding right and left sides, which are divided with respect to the central point of the tracking signal, have opposite polarities. The polarity of the tracking signal changes according to a type of the optical disc 100, or physical characteristics of the recording layer such as the physical characteristics of a pit or a track. In other words, the polarities of the tracking signal change from (−) to (+) and (+) to (−) according to the type of the optical disc 100 or the physical characteristics of the recording layer. The particulars of the optical disc 100 may be further recorded in the BCA, as well as the tracking polarity information.

Figure 6B:
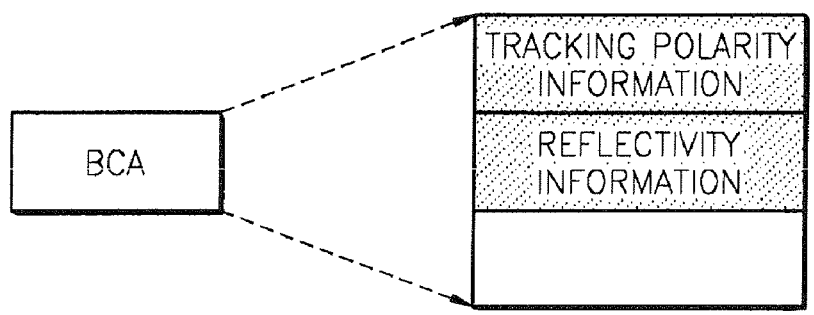
FIG. 6B illustrates the data structure of the BCA of the optical disc, according to another aspect of the present invention.

FIG. 6B illustrates a data structure of the BCA of the optical disc 100, according to another aspect of the present invention. The tracking polarity information and/or the reflectivity information is recorded in the BCA, according to an aspect the present invention. Here, the tracking polarity information is as described with reference to FIG. 6A. The reflectivity information provides the reflectivity of the optical disc 100, which is a ratio of the power of a laser beam reflected from the recording layer of the optical disc 100 to the power of the laser beam incident on the recording layer. The reflectivity also changes according to the type of the optical disc 100 or the physical characteristics of the recording layer.

Meanwhile, the tracking polarity information is recorded in both the BCAs of FIGS. 6A and 6B, but only the reflectivity information can be recorded if needed.

Figure 7:
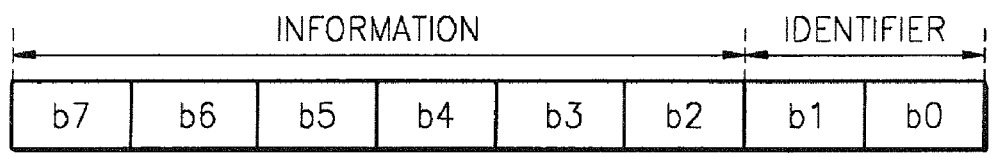
FIG. 7 illustrates the data structure of information recorded on the BCA of the optical disc, according to an aspect of the present invention.

FIG. 7 illustrates a data structure of the information recorded in the BCA of the optical disc 100, according to an aspect of the present invention. In detail, FIG. 7 shows an example of the BCA in the optical disc 100 having two recording layers as shown in FIGS. 4A, 4B, 5A, and 5B. The tracking polarity information is repeatedly recorded four times in the BCA and the recording begins at leading bytes of the BCA. The first two bits $b1 b0$ of the tracking polarity information are identifiers of the respective information that is repeatedly recorded. If the first two bits $b1b0$ are 00, the information indicates that first tracking polarity information is recorded in the BCA. If the first two bits $b1b0$ are 01, the information indicates that second tracking polarity information is recorded in the BCA. If the first two bits $b1b0$ are 10, the information indicates that third tracking polarity information is recorded in the BCA. If the first two bits $b1b0$ are 11, the information indicates that fourth tracking polarity information is recorded in the BCA. Repetitive recording of the information increases a robustness of the information. Even if an error occurs in one of the repeated recordings, it is possible to read desired information from the other recordings. The other six bits $b7b6b5b4b3b2$ provide the information. The bit $b2$ includes flag information indicating whether or not other information, i.e., the particulars of the optical disc 100, is recorded in the BCA. If the bit $b2$ is 0, the information indicates that the other information is not recorded in the BCA. If the bit $b2$ is 1, the information indicates that the other information is recorded in the BCA. The bits $b7b6b5b4b3$ represent the tracking polarity information and can be defined as follows:

00000: first recording layer=type A, second recording layer=type B
  00001: first recording layer=type B, second recording layer=type A
  00010: first recording layer=second recording layer=type A
  00011: first recording layer=second recording layer=type B For instance, when the other information is not recorded in the BCA, and the polarities of the tracking signals related to the first and second recording layers are type B and type A, respectively, the six bits $b7b6b5b4b3b2$ is expressed as '000010'. When the other information, such as the particulars of the optical disc 100, is recorded in the BCA and both polarities of the tracking signals related to the first and second recording layers are type A, the six bits $b7b6b5b4b3b2$ is expressed as '000101'.

If 1 byte is not enough to express the tracking polarity information, for example, if the number of recording layers is more than 2, it is possible to express the tracking polarity information using additional bits in addition to the 1 byte.

When the optical disc 100 is loaded into a disc drive of the optical disc reproducing apparatus, the disc drive easily accesses leading bytes of the BCA so as to read the tracking polarity information and/or the reflectivity information. Accordingly, the recording of the tracking polarity information and/or reflectivity information may begin on the leading bytes of the BCA.

A method of reproducing the data from the optical disc 100, according to an aspect of the present invention, will now be described. As mentioned above, the data that is reproduced using the method is not the user data, but the tracking polarity information and/or the reflectivity information recorded in a BCA of the optical disc 100. The reproduction of such data can be performed both when recording and reproducing the user data in a data area.

FIG. 8 is a flowchart illustrating the method of reproducing the data from the optical disc 100, according to an aspect of the present invention. Referring to FIG. 8, at operation 801, when the optical disc 100 is loaded into the disc drive of the reproducing apparatus of FIG. 2, at operation 802 the optical pickup included in the disc drive reads the tracking polarity information from the BCA of the optical disc 100. At operation 803, the reproducing apparatus (or the disc drive) performs the tracking on the optical disc 100 using the read tracking polarity information without trial and error, and records or reproduces the user data in a data area of the optical disc 100. In other words, the optical pickup provides the tracking polarity information to the disc drive, and then, the disc drive controls the optical pickup using the information to perform the recording or the reproducing of the user data on the optical disc 100.

FIG. 9 is a flowchart illustrating the method of reproducing the data from the optical disc 100, according to another aspect of the present invention. Referring FIG. 9, at operation 901, when the optical disc 100 is loaded into the disc drive of the reproducing apparatus of FIG. 2, at operation 902, the optical pickup included in the disc drive reads reflectivity information from the BCA of the optical disc 100. At operation 903, the reproducing apparatus (or the disc drive) adjusts the write/read power of the laser beam using the read reflectivity information without trial and error, and records or reproduces the user data in the data area of the optical disc 100. In other words, the optical pickup provides the reflectivity information to the disc drive, and then, the disc drive controls the optical pickup using the information to perform the recording or the reproducing of the user data on the optical disc 100.

As described above, tracking polarity information and/or reflectivity information is recorded in a BCA of an optical disc according to an aspect of the present invention. Accordingly, it is possible to obtain the tracking polarity information and/or reflectivity information without trial and error and directly record or reproduce user data in a data area of the optical disc.

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. An apparatus for processing data recorded in an information storage medium comprising a burst cutting area, a lead-in area, and a data area, the data area having a plurality of tracks formed therein, the apparatus comprising:
an optical pickup arranged to emit a light to the information storage medium to transfer data with respect to the information storage medium comprising two recording layers, one of the two recording layers comprising the burst cutting area in which a first physical format of data is recorded, and the first physical format of data comprising tracking polarity information for each of the two recording layers; and
a controller arranged to control the optical pickup:
to reproduce the tracking polarity information from the burst cutting area before the pickup follows the tracks formed in the data area on the information storage medium comprising a second physical format of data, and
to control the optical pickup to use the tracking polarity information in following the tracks formed in the data area on the information storage medium,
wherein the burst cutting area further comprises information that indicates whether disc information is recorded as the first physical format of data in the burst cutting area.

2. The apparatus of claim 1, wherein the burst cutting area further comprises information that indicates whether disc information is recorded in a block of the burst cutting area.

3. The apparatus of claim 2, wherein, when the information indicates that disc information is recorded in the block of the burst cutting area, the disc information comprises the tracking polarity information.

4. An information storage medium comprising two recording layers, the information storage medium comprising a burst cutting area, a lead-in area, and a data area, the data area having a plurality of tracks formed therein, wherein:
one of the two recording layers comprises the burst cutting area in which a first physical format of data is recorded;
the first physical format of data comprises tracking polarity information for each of the two recording layers; and
the tracking polarity information is read before a pickup follows the tracks formed in the data area on the information storage medium comprising a second physical format of data, and is used in following the tracks formed in the data area on the information storage medium,
wherein the burst cutting area further comprises information that indicates whether disc information is recorded as the first physical format of data in the burst cutting area.

5. The information storage medium of claim 4, wherein:
the first physical format of data is data which is recorded in a form of stripe in a radial direction; and
the second physical format of data is a pit which is formed in a tracking direction.

6. The information storage medium of claim 4, wherein the burst cutting area is arranged between a clamping area and a lead-in area in corresponding recording layer.

7. The information storage medium of claim 4, wherein the burst cutting area further comprises information that indicates whether disc information is recorded in a block of the burst cutting area.

8. The information storage medium of claim 7, wherein, when the information indicates that disc information is recorded in the block of the burst cutting area, the disc information comprises the tracking polarity information.

9. The information storage medium of claim 4, wherein the second physical format of data is reflectivity information and is recorded with a pattern of crystalline marks.

10. The information storage medium of claim 4, wherein the second physical format of data is reflectivity information and is recorded with a pattern of non-crystalline marks.

11. A method for processing data recorded in an information storage medium comprising a plurality of recording layers, at least one of the recording layers comprising a burst cutting area, a lead-in area, and a data area, the burst cutting area having striped bar data formed therein, and the data area having a plurality of tracks formed therein, the method comprising:

reproducing tracking polarity information for each of the recording layers from the burst cutting area before a pickup follows the tracks formed in the lead-in area and the data area on the information storage medium, reproducing data from the information storage medium using the tracking polarity information for each of the recording layers, in following the tracks formed in the data area on the information storage medium, wherein the burst cutting area further comprises information that indicates whether disc information is recorded in the burst cutting area.

12. The method of claim 11, wherein the tracking polarity information is data which is formed radially in the burst cutting area in a bar shape.

13. The method of claim 11, wherein the burst cutting area further comprises information that indicates whether disc information is recorded in a block of the burst cutting area.

14. The method of claim 13, wherein, when the information indicates that disc information is recorded in the block of the burst cutting area, the disc information comprises the tracking polarity information.

15. An apparatus for processing data recorded in an information storage medium comprising a plurality of recording layers, at least one of the recording layers comprising a burst cutting area, a lead-in area, and a data area, the burst cutting area having striped bar data formed therein, and the data area having a plurality of tracks formed therein, the apparatus comprising:

a pickup which emits or receives a light to transfer data with respect to the information storage medium; and a controller which controls the pickup to:

reproduce tracking polarity information for each of the recording layers from the burst cutting area, before the pickup follows the tracks formed in the data area on the information storage medium; and reproduce data from the information storage medium using the tracking polarity information for each of the recording layers in following the tracks formed in the data area on the information storage medium, wherein the burst cutting area further comprises information that indicates whether disc information is recorded in the burst cutting area.

16. The apparatus of claim 15, wherein the burst cutting area further comprises information that indicates whether disc information is recorded in a block of the burst cutting area.

17. The apparatus of claim 16, wherein, when the information indicates that disc information is recorded in the block of the burst cutting area, the disc information comprises the tracking polarity information.

18. An information storage medium comprising a first recording layer and a second recording layer, one of the recording layers comprising a burst cutting area, a lead-in area, and a data area, the burst cutting area having striped bar data formed therein, and the data area having a plurality of tracks formed therein, wherein:

the burst cutting area, which is arranged in one of the first recording layer and the second recording layer, comprises tracking polarity information for each of the first and second recording layers; and the tracking polarity information is reproduced before a pickup follows the tracks formed in the data area on the information storage medium, wherein the burst cutting area further comprises information that indicates whether disc information is recorded in the burst cutting area.

19. The information storage medium of claim 18, wherein the burst cutting area further comprises information that indicates whether disc information is recorded in a block of the burst cutting area.

20. The information storage medium of claim 19, wherein, when the information indicates that disc information is recorded in the block of the burst cutting area, the disc information comprises the tracking polarity information.

* * * * *